Dec. 10, 1929.   G. B. HUNT ET AL   1,739,462
APPARATUS FOR PROLONGING THE LIFE OF CUT FLOWERS
Filed Sept. 12, 1928
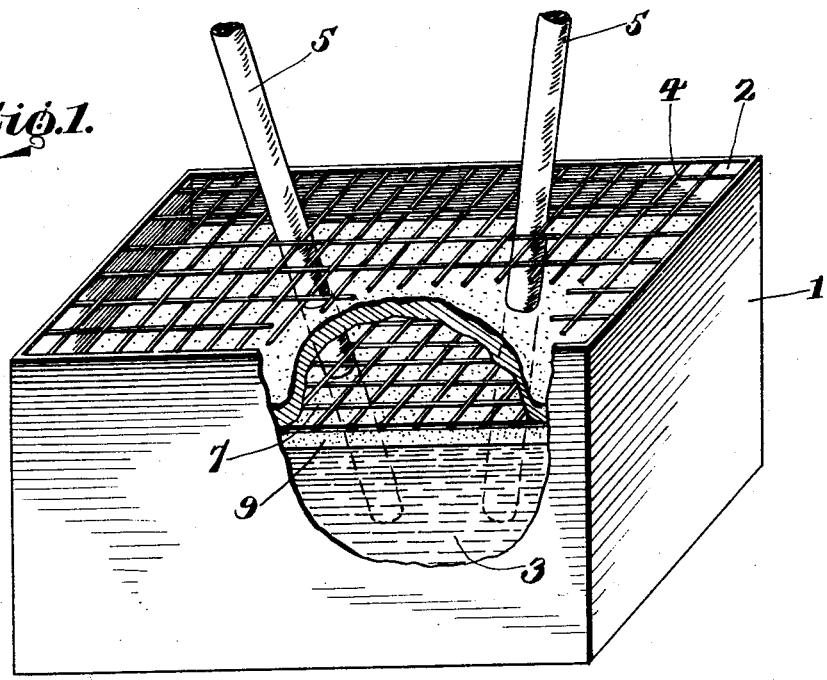
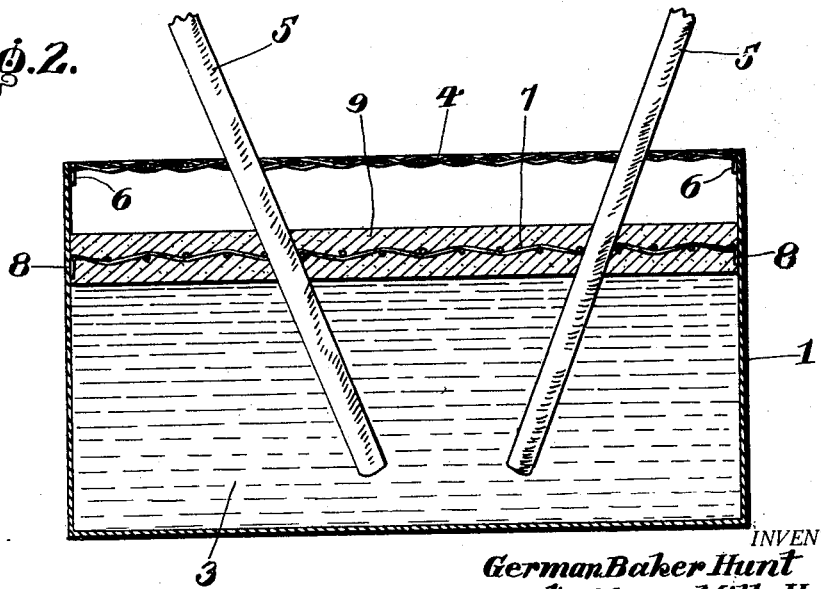
INVENTOR.
German Baker Hunt
Mary Mills Hunt,
BY
Geo. F. Kimmel
ATTORNEY.

Patented Dec. 10, 1929

1,739,462

UNITED STATES PATENT OFFICE

GERMAN BAKER HUNT AND MARY MILLS HUNT, OF MONROE, LOUISIANA

APPARATUS FOR PROLONGING THE LIFE OF CUT FLOWERS

Application filed September 12, 1928. Serial No. 305,566.

This invention relates to a method and apparatus for prolonging the life of cut flowers and has for its primary object to provide, in a manner as hereinafter set forth, a container for supporting the stems of cut flowers with the lower portions thereof sealed within a quantity of water whereby the atmosphere is excluded from the water.

A further object of the invention is to provide a container as aforesaid, including as a part thereof means for supporting the stems at various angles as desired and adapted for use as a vase, basket, or bouquet holder, or a base for funeral offerings, floral designs, or the like.

With the foregoing and other objects in view the invention consists of the novel construction, combination and arrangement of parts as hereinafter more particularly described and illustrated in the accompanying drawings, wherein for the purpose of illustration is shown an embodiment of the invention, but it is to be understood that changes, variations and modifications may be resorted to which fall within the scope of the invention as claimed.

In the accompanying drawings in which like numerals are employed to designate like parts throughout the same, Figure 1 is a perspective view of a container constructed in accordance with this invention, showing a pair of flower stems supported therein.

Figure 2 is a vertical section through the embodiment shown in Figure 1.

Referring now to the drawing, the numeral 1 designates a container which is in the present instance in the form of a rectangular box having an open top 2 but it is to be understood that the body of the container may be of any shape desired. The container 1 may be constructed of any suitable, impervious material such as metal, wood, waterproof paper, glass, or the like, and is adapted to contain a quantity of water as indicated by the numeral 3.

The open top 2 of the container 1 is provided with a foraminous cover 4 which in the present instance is in the form of a wire mesh but which may be of any suitable construction to permit the passage therethrough of the lower ends of flower stems 5. The cover 4 is secured to the side walls of the container 1 as indicated by the numeral 6. Spaced from the cover 4 is a partition 7 which may be constructed in the same manner as the cover 4 and which is secured to the side walls of the container 1 as indicated by the numeral 8. The foraminous construction of the cover 4 and partition 7 permits the stems 5 to be inserted through the cover 4 and partition 7 at any angle desired in order that the flowers may be arranged in various designs and supported by the cover 4 and partition 7 with the lower ends of the stems 5 extending into the water 3.

After the stems 5 have been arranged as desired and inserted through the cover 4 and partition 7, a sealing medium 9, such as paraffin, is poured into the container to rest on the water 3 and to surround the stems 5 and to completely encase the partition 7, whereby the water 3 is sealed to the atmosphere. The partition 7 coacts with the cover 4 to support the stems 5 in various positions as desired and also forms a base for the sealing medium 8 and serves as a reinforcement for the latter.

It is thought that the many advantages of a device in accordance with this invention can be readily understood and although the preferred embodiment is as herein illustrated and described, it is to be understood that various changes may be made in the details of construction without departing from the spirit of the invention or the scope of the appended claims.

What we claim is:

1. An apparatus for prolonging the life of cut flowers comprising, an open top receptacle adapted to contain water, a foraminous partition extending transversely of the receptacle for the passage of flower stems therethrough to support the stems with the lower portions thereof extending into the water, and a sealing medium disposed around said stems and engaging said partition to provide an impervious cover for sealing the water to the atmosphere.

2. An apparatus for prolonging the life of cut flowers comprising, an open top receptacle adapted to contain water, a pair of spaced, foraminous partitions extending transversely of the container for the passage of flower stems therethrough to support the latter at any angle desired with their lower portions extending into the water, and a sealing medium disposed around said stems and engaging one of said partitions to provide an impervious cover for sealing the water to the atmosphere.

In testimony whereof, we affix our signatures hereto.

GERMAN BAKER HUNT.
MARY MILLS HUNT.